(12) United States Patent
Herness et al.

(10) Patent No.: US 7,921,075 B2
(45) Date of Patent: Apr. 5, 2011

(54) GENERIC SEQUENCING SERVICE FOR BUSINESS INTEGRATION

(75) Inventors: Eric Nels Herness, Byron, MN (US); Anh-Khoa Dinh Phan, Rochester, MN (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 11/536,962

(22) Filed: Sep. 29, 2006

(65) Prior Publication Data
US 2008/0091679 A1    Apr. 17, 2008

(51) Int. Cl.
G06F 7/08 (2006.01)
G06F 17/30 (2006.01)

(52) U.S. Cl. .................. 707/607; 707/747; 718/100
(58) Field of Classification Search ............... 707/1–10, 707/100, 104.1, 200, 201, 607, 608, 736, 707/747; 718/100–103
See application file for complete search history.

(56) References Cited

U.S. PATENT DOCUMENTS

| | | | |
|---|---|---|---|
| 5,305,454 A | 4/1994 | Record et al. | |
| 5,465,328 A | 11/1995 | Dievendorff et al. | |
| 5,544,318 A * | 8/1996 | Schmitz et al. | 709/207 |
| 5,682,537 A | 10/1997 | Davies et al. | |
| 5,913,213 A | 6/1999 | Wikstrom et al. | |
| 6,012,094 A * | 1/2000 | Leymann et al. | 709/230 |
| 6,108,654 A | 8/2000 | Chan et al. | |
| 6,112,225 A | 8/2000 | Kraft et al. | |
| 6,125,363 A | 9/2000 | Buzzeo et al. | |
| 6,128,611 A | 10/2000 | Doan et al. | |
| 6,233,585 B1 | 5/2001 | Gupta et al. | |
| 6,442,572 B2 * | 8/2002 | Leymann et al. | 707/203 |
| 6,449,614 B1 | 9/2002 | Marcotte | |
| 6,601,233 B1 | 7/2003 | Underwood | |
| 6,625,602 B1 * | 9/2003 | Meredith et al. | 707/8 |
| 6,654,948 B1 | 11/2003 | Konuru et al. | |
| 6,681,230 B1 | 1/2004 | Blott et al. | |
| 6,697,802 B2 | 2/2004 | Ma et al. | |

(Continued)

FOREIGN PATENT DOCUMENTS

EP    1603307 A2 *    12/2005

OTHER PUBLICATIONS

U.S. Appl. No. 11/536,941, filed Sep. 29, 2006, Herness et al.

(Continued)

*Primary Examiner* — John R. Cottingham
*Assistant Examiner* — James E Richardson
(74) *Attorney, Agent, or Firm* — Yee & Associates, P.C.; Prentiss W. Johnson

(57) ABSTRACT

A computer implemented method, data processing system, and computer program product for providing a generic sequencing service for ordering processing requests in a scalable business integration environment. When a request is received at a sequencing component, the operation specified in the request is identified. A determination is then made as to whether to sequence the operation according to a sequencing specification. If the operation is to be sequenced, key information of the operation is classified according to the sequencing specification. A lock on the request is then requested using the operation and the key information. Responsive to the lock being granted, a determination is then made as to whether the request is synchronous or asynchronous. If the request is synchronous, the target service component is invoked synchronously. If the request is asynchronous, the target service component is invoked asynchronously.

18 Claims, 6 Drawing Sheets

U.S. PATENT DOCUMENTS

| | | | |
|---|---|---|---|
| 6,742,016 B1* | 5/2004 | Bhoj et al. ................ 709/207 |
| 6,880,086 B2 | 4/2005 | Kidder et al. |
| 6,976,263 B2 | 12/2005 | Delaney |
| 6,993,246 B1 | 1/2006 | Pan et al. |
| 7,020,696 B1 | 3/2006 | Perry et al. |
| 7,047,258 B2 | 5/2006 | Balogh et al. |
| 7,206,848 B1* | 4/2007 | Zara et al. ................ 709/229 |
| 7,222,119 B1* | 5/2007 | Ghemawat et al. ............ 707/9 |
| 2002/0007363 A1* | 1/2002 | Vaitzblit .................. 707/202 |
| 2002/0016729 A1 | 2/2002 | Breitenbach et al. |
| 2003/0004970 A1 | 1/2003 | Watts |
| 2003/0061256 A1* | 3/2003 | Mathews et al. ........... 709/101 |
| 2003/0083912 A1 | 5/2003 | Covington, III et al. |
| 2004/0068501 A1* | 4/2004 | McGoveran ................. 707/8 |
| 2004/0093510 A1 | 5/2004 | Nurmela |
| 2004/0162741 A1 | 8/2004 | Flaxer et al. |
| 2004/0178454 A1 | 9/2004 | Kuroda et al. |
| 2004/0193510 A1 | 9/2004 | Catahan, Jr. et al. |
| 2004/0215614 A1 | 10/2004 | Doyle et al. |
| 2004/0220931 A1 | 11/2004 | Guthridge et al. |
| 2004/0220932 A1 | 11/2004 | Seeger et al. |
| 2004/0220933 A1 | 11/2004 | Walker |
| 2005/0021354 A1 | 1/2005 | Brendle et al. |
| 2005/0080806 A1 | 4/2005 | Doganata et al. |
| 2005/0091663 A1 | 4/2005 | Bagsby |
| 2005/0166187 A1 | 7/2005 | Das et al. |
| 2005/0256961 A1 | 11/2005 | Alon et al. |
| 2005/0262130 A1 | 11/2005 | Mohan |
| 2006/0004757 A1 | 1/2006 | Watts |
| 2006/0080486 A1* | 4/2006 | Yan ........................ 710/123 |
| 2006/0095571 A1* | 5/2006 | Gilgen et al. ............. 709/225 |
| 2006/0136914 A1* | 6/2006 | Marascio et al. ........... 718/100 |
| 2006/0149877 A1* | 7/2006 | Pearson ................... 710/260 |
| 2006/0167955 A1 | 7/2006 | Vertes |
| 2006/0218290 A1* | 9/2006 | Lin et al. ................ 709/229 |
| 2006/0259911 A1* | 11/2006 | Weinrich et al. ........... 719/315 |
| 2006/0282400 A1 | 12/2006 | Kalavacharla et al. |
| 2007/0226139 A1* | 9/2007 | Crumbach et al. ............ 705/40 |
| 2008/0091712 A1 | 4/2008 | Daherkar et al. |
| 2008/0148299 A1 | 6/2008 | Daherkar et al. |

OTHER PUBLICATIONS

Mansouri-Samani et al "A Configurable Event Service for Distributed Systems" Dept of Computing, Imperial College of Science, Technology and Medicine, IEEE 1996 pp. 210-217.

Meyer et al., "The Devolution of Functional Analysis", Workpaper, Honeywell Information Systems Ltd, Oct 26, 1982, pp. 65-91.

Arpaci-Dusseau , "Implicit Coscheduling: Coordinated Scheduling with Implicit Information in Distributed Systems", ACM Transactions on Computer Systems, vol. 19, No. 3, Aug. 2001, pp. 283-331.

Rinard et al., "Eliminating Synchronization Bottlenecks Using Adaptive Replication", ACM Transactions on Programming Languages and Systems, vol. 25, No. 3, May 2003, pp. 316-359.

* cited by examiner

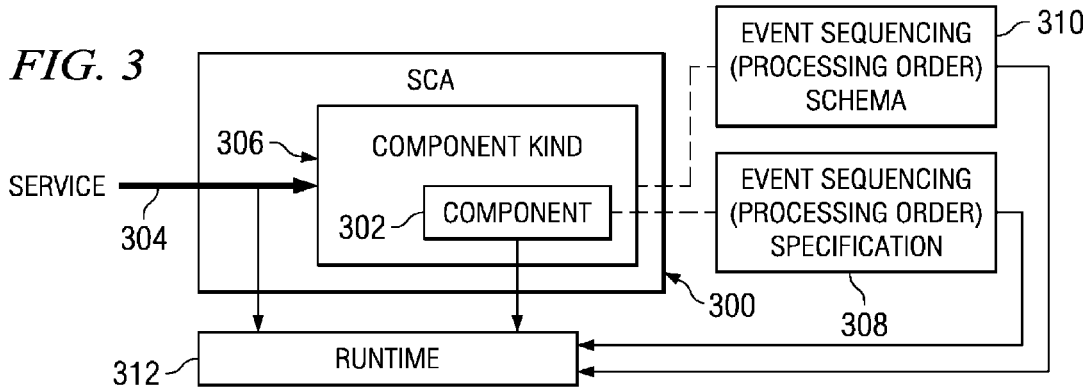

```
<?xml version="1.0" encoding="UTF-8"?>
<schema
  xmlns="http://www.w3.org/2001/XMLSchema"
  xmlns:es
    ="http://www.ibm.com/xmlns/prod/websphere/wbiserver/eventSequencing/6.0.0"
  targetNamespace
    ="http://www.ibm.com/xmlns/prod/websphere/wbiserver/eventSequencing/6.0.0">
                                   ╭─402
<element name="eventSequencing" type="es:eventSequencing" />

<complexType name="eventSequencing">
  <sequence minOccurs="1" maxOccurs="unbounded">
    <element name="operationSequencingGroup"
        type="es:operationSequencingGroup"/>    404
  </sequence>
</complexType>           404

<complexType name="operationSequencingGroup">
  <sequence minOccurs="1" maxOccurs="unbounded">
    <element name="operationSequencing" type="es:operationSequencing"/>
  </sequence>
</complexType>        406  406

<complexType name="operationSequencing">
  <sequence>          ╭─408
    <element name="operation" type="string"/>
    <sequence minOccurs="0" maxOccurs="unbounded">
      <element name="keySpecification" type="es:keySpecification" />
    </sequence>
  </sequence>        410
</complexType>
```

FIG. 5

```
                410                                  400
<complexType name="keySpecification">
  <sequence>
    <element name="parameterName" type="string"/>
    <!-- for now, 0 occurance of attribute implies that either
         the parameter has a key by default or it's a primitive type.
      -->
    <sequence minOccurs="0" maxOccurs="unbounded">
      <element name="keyAttribute" type="es:keyAttribute"/>
    </sequence>
  </sequence>                412
</complexType>
                             412
<complexType name="keyAttribute">
  <sequence>
    <element name="attributeName" type="string"/>
    <!-- probably needs to qualify this xpath string -->
    <element name="xpath" type="string"/>
  </sequence>
  <!--
    <key name="esKey">
      <selector xpath="./fieldName"/>
      <field xpath="@value"/>
    </key>
    -->
</complexType>

</schema>
```

FIG. 6

```
                                                     600
<?xml version="1.0" encoding="UTF-8"?>
<es:eventSequencing
    xmlns:es="http://www.ibm.com/xmlns/prod/websphere/wbiserver/eventSequencing/6.0.0">
  <operationSequencingGroup>  602
    <operationSequencing>  604
      <operation>update</operation>
      <keySpecification>  608
606
        <parameterName>account</parameterName>
610
      </keySpecification>
    </operationSequencing>  612
  </operationSequencingGroup>
</es:eventSequencing>
```

```xml
<?xml version="1.0" encoding="UTF-8"?>
<es:eventSequencing
    xmlns:es="http://www.ibm.com/xmlns/prod/websphere/wbiserver/eventSequencing/6.0.0">
  <operationSequencingGroup>           702
    <operationSequencing>              704
      <operation>update</operation>
      <keySpecification>               708
714     <parameterName>account</parameterName>
      </keySpecification>
    </operationSequencing>   712
    <operationSequencing>              706
      <operation>upgrade</operation>
      <keySpecification>               710
716     <parameterName>account</parameterName>
      </keySpecification>
    </operationSequencing>   712
  </operationSequencingGroup>
</es:eventSequencing>
```

```xml
<?xml version="1.0" encoding="UTF-8"?>
<schema xmlns="http://www.w3.org/2001/XMLSchema"
    xmlns:es="http://www.ibm.com/xmlns/prod/websphere/wbiserver/es/6.0.0"
    xmlns:scdl="http://www.ibm.com/xmlns/prod/websphere/scdl/6.0.0"
    targetNamespace="http://www.ibm.com/xmlns/prod/websphere/wbiserver/es/6.0.0">
  <import
    namespace="http://www.ibm.com/xmlns/prod/websphere/scdl/6.0.0"
    schemaLocation="scdl.xsd" />   802
  <!--Event sequencing implementation-->
  <complexType name="EventSequencingImplementation">
    <complexContent>
      <extension base="scdl:Implementation">
        <attribute name="esFile" type="string" />
      </extension>
    </complexContent>
  </complexType>

</schema>
```

FIG. 9

```xml
<?xml version="1.0" encoding="UTF-8"?>
<scdl:component
    xmlns:xsi="http://www.w3.org/2001/XMLSchema-instance"
    xmlns:java="http://www.ibm.com/xmlns/prod/websphere/scdl/java/6.0.0"
    xmlns:scdl="http://www.ibm.com/xmlns/prod/websphere/scdl/6.0.0"
    xmlns:es="http://www.ibm.com/xmlns/prod/websphere/wbiserver/es/6.0.0"
    name="bvt/target/InnerTargetSequencing">            902

<interfaces>
    <interface xsi:type="java:JavaInterface"
        interface="bvt.target.BankOperation"/>
</interfaces>                                           904

<implementation xsi:type="es:EventSequencingImplementation"
    esFile="bvt/target/InnerTarget.sequencing"/>        906

<references>                        908
    <reference name="InnerTarget">  910
        <interface xsi:type="java:JavaInterface"
            interface="bvt.target.BankOperation">
            <method name="update"/>             904
        </interface>                            914
        <wire target="bvt/target/InnerTarget"/>
    </reference>                                912
</references>

</scdl:component>
```

900

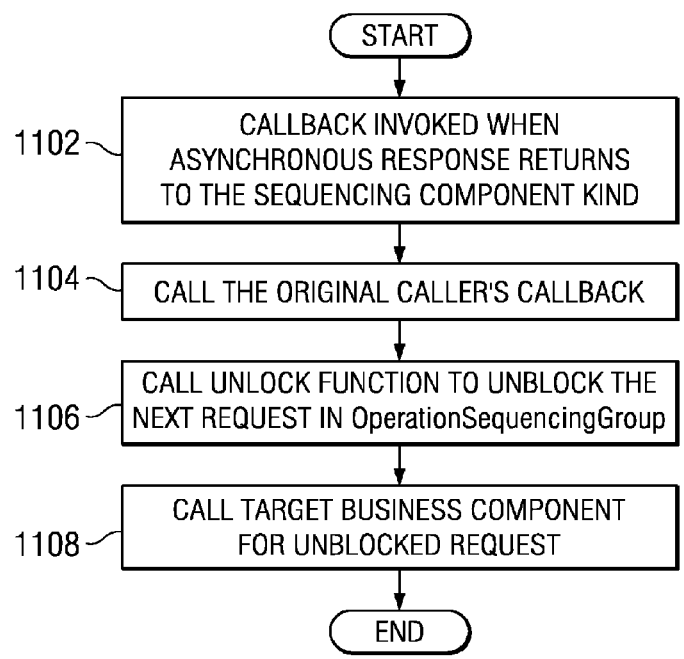

FIG. 11

START
↓
1102 — CALLBACK INVOKED WHEN ASYNCHRONOUS RESPONSE RETURNS TO THE SEQUENCING COMPONENT KIND
↓
1104 — CALL THE ORIGINAL CALLER'S CALLBACK
↓
1106 — CALL UNLOCK FUNCTION TO UNBLOCK THE NEXT REQUEST IN OperationSequencingGroup
↓
1108 — CALL TARGET BUSINESS COMPONENT FOR UNBLOCKED REQUEST
↓
END

GENERIC SEQUENCING SERVICE FOR BUSINESS INTEGRATION

BACKGROUND OF THE INVENTION

1. Field of the Invention

The present invention relates generally to an improved data processing system, and in particular, to a computer implemented method, data processing system, and computer program product for providing a generic sequencing service for ordering processing requests in a business integration environment.

2. Description of the Related Art

The integration of business processes across organizations allows individuals and systems both internal and external to an enterprise to communicate and work together in support of business strategies. Clients may call out a service in the business enterprise, and the appropriate business component in the business enterprise responds to the request. A client may issue a synchronous request, meaning that the client issues the request for a service and then suspends its processing while waiting for a response. In this manner, the client controls the order or sequence of the requests, since the client will not initiate the next request until the previous request has been processed. However, it is common in business integration environments that requests are batched together asynchronously, or in parallel. With an asynchronous request, the client issues a request for a service and then resumes its processing without waiting for a response from the business component. The service handles the client request and returns a response at a later time, at which time the client retrieves the response and proceeds with its processing.

For example, a client may issue requests to a target component which comprise a set of changes to be made, which are passed along asynchronously via, for example, a message queue (MQ). To correctly process these asynchronous requests, the service must observe the order in which the requests are received, since two or more of the asynchronous requests may operate on the same target. Consider the example of a banking service which allows customers to make deposits, withdrawals, and check account information. For a given account, a customer may issue two asynchronous requests to modify an account—one to deposit $100 into the account, and one to withdraw $50 from the account. In this example, it may be important that the banking service processes the asynchronous requests in the order in which they are received (first deposit, then withdraw), so that funds will be available in the customer's account to withdraw. If the requests are not processed in sequence, adverse consequences may result, such as the customer incurring charges for having insufficient funds for the withdrawal.

Solutions in the current art provide for single-threading asynchronous requests in order to maintain the processing order, such that all requests received from clients are processed serially. Thus, processing order is maintained since the service receiving all of the requests must provide a response to the first request before responding to the next request. Although serial processing allows one to maintain the processing order, it is not scalable. Thus, although the current art allows one to guarantee the processing order of requests, it does not, however, allow for adapting to increased demands on the system and provide scalability.

Therefore, it would be advantageous to have an improved system and method for ensuring that the order in which requests are processed is preserved in a scalable business integration environment.

SUMMARY OF THE INVENTION

The illustrative embodiments provide a computer implemented method, data processing system, and computer program product for providing a generic sequencing service for ordering processing requests in a scalable business integration environment. When a request is received at a sequencing component, the operation specified in the request is identified. A determination is then made as to whether to sequence the operation according to a sequencing specification. If the operation is to be sequenced, key information of the operation is classified according to the sequencing specification. A lock on the request is then requested using the operation and the key information. Responsive to the lock being granted, a determination is then made as to whether the request is synchronous or asynchronous. If the request is synchronous, the target service component is invoked synchronously. If the request is asynchronous, the target service component is invoked asynchronously.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram of exemplary components with which the generic sequencing service for ordering processing requests of the illustrative embodiments may be implemented;

FIGS. 4 and 5 illustrate an exemplary schema for specifying the processing order of requests in accordance with the illustrative embodiments;

FIG. 6 illustrates an exemplary extensible markup language file specifying the processing request order for an update operation in accordance with the illustrative embodiments;

FIG. 7 illustrates an exemplary extensible markup language file specifying the processing order for multiple operations in accordance with the illustrative embodiments;

FIG. 8 illustrates a schema for declaring the component specification extension for Service Component Architecture (SCA) in accordance with the illustrative embodiments;

FIG. 9 illustrates an exemplary extensible markup language component file declaring an SCA component in accordance with the illustrative embodiments;

FIG. 11 is a flowchart of a process for invoking a callback to the sequencing component in accordance with the illustrative embodiments.

DETAILED DESCRIPTION OF THE PREFERRED EMBODIMENT

Figure 1:
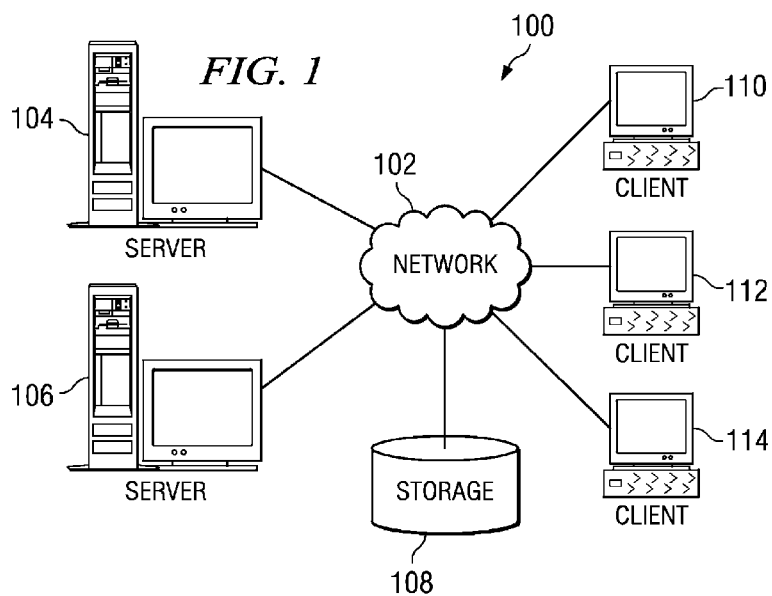
FIG. 1 depicts a pictorial representation of a network of data processing systems in which the illustrative embodiments may be implemented.
Figure 2:
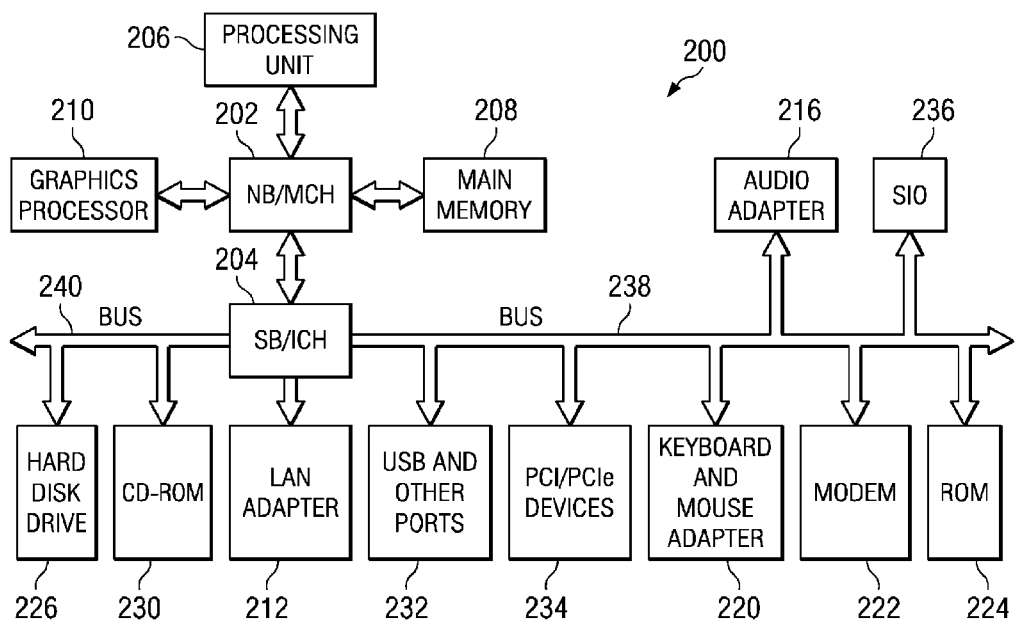
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, data processing system, and computer program product for preserving the order in which requests are processed in a business integration environment. The generic sequencing service in the illustrative embodiments provides a declarative programming model that allows a user to specify the order that particular requests (e.g., asynchronous requests) received by a target business component are processed by the component. In this manner, the order of requests received by a component may be preserved.

To specify the processing order, a user may first define criteria in which the requests may be classified. Each asynchronous request received from a client is classified according to the criteria defined by the user. For example, for a banking service, the user may specify that the bank account number supplied within each request should be used to classify the requests. Thus, requests having the same bank account number are classified together, and requests having a different bank account number will not have the same classification. In another example, for a retail supplier, the user may specify that a customer identifier (customer ID) supplied within each request, such as a string of alphanumeric characters identifying the requesting customer, should be used to classify the requests. Requests having the same customer ID will have the same classification, and requests with a different customer ID will have different classifications. Although bank account number and customer ID are used to describe particular classification criteria, the generic sequencing service in the illustrative embodiments is not limited to a particular set of criteria; rather, the generic sequencing service provides flexibility by allowing the user to specify classification criteria to suit the particular business purpose.

The generic sequencing service also provides for scalability of the sequencing service by allowing particular requests to be processed serially (and in a particular order) while allowing other requests to be processed in parallel. The generic sequencing service uses the request classification to determine whether a request is relevant. A request is relevant if the request has the same classification as another request in the group. For example, requests may be deemed relevant if a banking service receives two or more requests to update the same bank account, and the classification criteria of these requests are based on bank account number. In this case, the order in which the requests are processed is important and should be preserved. Conversely, a request may be deemed irrelevant if the banking service receives another request to update a different bank account. In this case, since the requests modify different bank accounts, the order in which these requests are processed requests does not matter, and thus the requests may be processed in parallel.

In one illustrative embodiment, the generic sequencing service is described in the context of the Service Component Architecture (SCA) framework (as shown below in FIG. 3). In this context, the software is organized as services provided by components. Components that provide business services are programmed/scripted based on the type of component, or 'component kind'. The component kind concept is used to capture the type of the component, for example, a service, a business process execution language (BPEL) workflow, a data-map, and the like, that can be customized and reused easily. For example, a BPEL component kind means that the implementation of the service will be a BPEL process. SCA is inherently extensible, and the illustrative embodiments allow a new component kind to be designed and built for the SCA service. This new component kind is called 'sequencing component kind'. The sequencing component kind allows one to specify an event sequencing specification using a declarative language. The sequencing component kind observes the process sequencing specified and is scalable.

FIG. 3 is a diagram of exemplary components with which the generic sequencing service for ordering processing requests may be implemented. The components shown in FIG. 3 may be implemented in a data processing system, such as data processing system 200 in FIG. 2. One exemplary application to which the generic sequencing service may apply is a WebSphere® Process Server business application. WebSphere® Process Server (WPS) is a product available from International Business Machines Corporation. WebSphere® Process Server business applications are composed of interacting services. In this illustrative example, Service Component Architecture (SCA) 300 provides a container in which components, such as component 302, may reside. Services, such as service 304, are provided by the components and made available by the Service Component Architecture.

Each component within SCA 300 is programmed/scripted in a component kind specific way. For example, component kind 306 may be scripted or programmed in a component-kind specific markup language. The generic sequencing service in the illustrative embodiments extends SCA by implementing a new component kind, sequencing component kind, which allows one to specify an event sequencing (processing order) specification 308 using a declarative language.

For each sequencing component kind, the corresponding event sequencing specification 308 allows the sequencing component kind to observe the sequence of incoming service requests to determine the order the requests are to be processed. Event sequencing specification 308 is an XML file which defines the language for the sequencing specification, and also specifies the keys and operations of the requests that are to be ordered. Event sequencing (processing order) schema 310 specifies the classification logic and defines the declarative language which is used to construct event sequencing specification 308. Event sequencing specification 308 and event sequencing schema 310 may be provided to Monitoring Runtime 312. Monitoring Runtime 312 provides an implementation that uses the event sequencing specification 308 and event sequencing schema 310 to order the processing of requests in the business integration environment.

Turning next to FIGS. 4 and 5, an exemplary schema defining the declarative language used to specify the processing order of requests in accordance with the illustrative embodiments is shown. Schema 400 may be implemented as a markup language schema using a standard schema format, such as extensible schema definition (XSD) format. Schema 400 is an example of an event sequencing schema, such as event sequencing schema 310 in FIG. 3. In this illustrative example, schema 400 includes eventsequencing 402 element, which specifies the order in which the events or requests are to be processed.

EventSequencing 402 comprises operationSequencingGroup 404, which defines the group of requests to be processed in a particular order. OperationSequencingGroup 404 includes an operation sequencing element (operationSequencing 406) which specifies the order in which the operations are to be processed. OperationSequencing 406 is defined by operation 408 element and a key specification element (keySpecification 410). Operation 408 describes a type of operation of the event, such as, for example, 'update' or 'upgrade'. Operations defined in the same operationSequencingGroup 404 are executed one by one in a designated sequence.

In addition, data types such as keySpecification 410 and keyAttribute 412 may be used to define a particular property or attribute of a service data object (SDO) to be the key. Keys are used to define the actual lock/isolation object used to classify the requests and thereby determine the processing order. A lock is a mechanism for isolating data by enforcing limits on access to a resource in an environment where there are many threads of execution. For example, if the lock/isolation object is the bank account number, the key is used to determine which requests are relevant (i.e., requests directed to a same bank account number) and then preserve the order of those relevant requests.

FIG. 6 illustrates an exemplary extensible markup language (XML) file specifying the processing request order for an update operation in accordance with the illustrative embodiments. In particular, this exemplary extensible markup language file is an example of an event sequencing specification, such as event sequencing specification 308 in FIG. 3, which utilizes the schema 400 in FIGS. 4 and 5 to specify the sequence of processing the requests.

Event sequencing specification XML file 600 comprises operationSequencingGroup 602 which includes an operation sequencing element (operationSequencing 604). OperationSequencing 604 comprises operation 606, which defines the type of operation of the request. Given an example interface

```
public interface bankOperation {
    public void update(String account, int amount);
}
``` the operation in event sequencing specification XML file 600 is 'update' 608. A key specification element (KeySpecification 610) defines the lock/isolation object, which in this case is the bank account number ('account' 612). Thus, update operation requests directed to a given bank account are classified as relevant and will be processed one-by-one in a particular order. In contrast, requests that are directed to different bank accounts are not classified as relevant to one other, and thus, these update operation requests may be processed in parallel.

FIG. 7 illustrates an exemplary extensible markup language file specifying the processing request order for multiple operations in accordance with the illustrative embodiments. Like event sequencing specification XML file 600 in FIG. 6, this exemplary extensible markup language file also utilizes event sequencing schema 400 in FIGS. 4 and 5 to specify the sequence of processing the requests. This XML file also illustrates the flexibility of schema 400. In particular, event sequencing specification XML file 700 shows how one may specify that multiple operations of the same interface are to be processed in a particular order.

For example, interface

```
public interface bankOperation {
    public void update(String account, int amount);
    public void upgrade(String account, int type);
}
``` comprises two bank operations: update and upgrade. Event sequencing specification XML file 700 comprises OperationSequencingGroup 702 which defines the operationSequencing 704 and 706 for each operation (update 708 and upgrade 710). In this illustrative example, since 'account' 712 is defined as the KeySpecification 714 and 716 for update 708 operation and upgrade 710 operation, an update and an upgrade operation are be performed serially and in order if the operations are directed to the same account. In other words, operations performed on the same account are be performed one after the other. In contrast, the update 708 operation and upgrade 710 operation may be performed in parallel if the operations are directed to different accounts.

FIG. 8 illustrates a schema for declaring the component specification extension for Service Component Architecture (SCA) in accordance with the illustrative embodiments. In particular, FIG. 8 illustrates the component specification extension for SCA using Service Component Description Language (SCDL) to define the component. An SCDL file is an XML file that references the elements used to produce the component. Schema 800 may be implemented as a markup language schema using a standard schema format, such as extensible schema definition (XSD) format. In this illustrative example, schema 800 includes eventSequencingImplementation 802, which defines the component extension for providing the event sequencing.

FIG. 9 illustrates an exemplary extensible markup language component file declaring an SCA component in accordance with the illustrative embodiments. In particular, the component file in FIG. 9 illustrates how one may declare an SCA sequencing component using the defining component schema 800 in FIG. 8 and the event sequencing specifications in FIGS. 6 and 7 as the implementation of the component.

In this illustrative example, the implementation of the sequencing component is defined as component 'bvt/target/InnerTargetSequencing' 902. Sequencing component 'bvt/target/InnerTargetSequencing' 902 determines the order in which the requests are to be processed. Sequencing component 'bvt/target/InnerTargetSequencing' 902 includes interface 'bvt.target.BankOperation' 904 and the implementation type EventSequencingImplementation 906, which includes sequencing file 'bvt/target/InnerTarget.Sequencing' 908. Reference 'InnerTarget' 910 includes interface 'bvt.target.BankOperation' 904 and a wire target 'bvt/target/InnerTarget' 912, which implements the business logic of the target component. The method name of the operation is defined as 'update' 914. The implementation of the sequencing component 'bvt/target/InnerTarget.Sequencing' 908 precedes the real business service component 'bvt/target/InnerTarget' 912, so that the sequencing component may provide the necessary ordering of requests before the real business service component is called.

Figure 10:
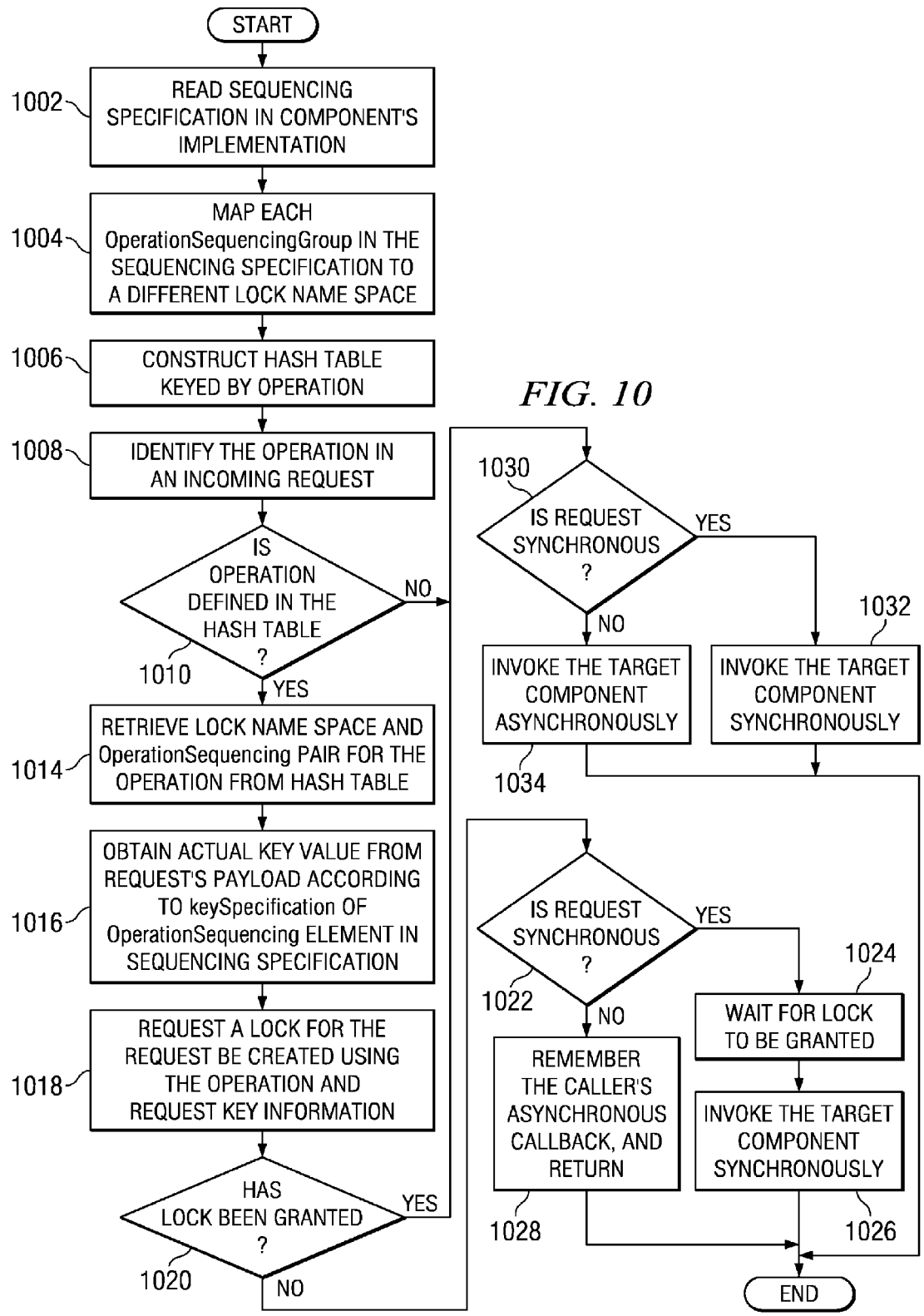
FIG. 10 is a flowchart of a process for guaranteeing the processing order of asynchronous requests in a business integration environment in accordance with the illustrative embodiments.

FIG. 10 is a flowchart of a process for guaranteeing the processing order of asynchronous requests in a business integration environment in accordance with the illustrative embodiments. The process described in FIG. 10 may be implemented in a data processing system, such as data processing system 200 in FIG. 2.

The process begins with the sequencing component kind reading the sequencing specification in the component's implementation (step 1002), such as, for example, esfile "bvt/target/InnerTarget.Sequencing" 908 in FIG. 9 to determine the order of processing requests. Upon reading the sequencing specification, the sequencing component kind maps each operation sequencing group specified in the sequencing specification to a different lock name space (LNS) (step 1004). The lock name space is a logical name space that is not exposed to the user. The sequencing component kind then constructs a hash table within an internal in-memory data structure, wherein the hash table is keyed by operation (step 1006). The value of each operation in the hash table is defined as a lock name space and operation sequencing pair (e.g., LNS, OperationSequencing).

When an incoming service request is received at a sequencing component, the sequencing component kind identifies the operation in the incoming request (step 1008). It should be noted that a sequencing component is usually placed in front of the target business service component to preserve ordering. In other words, the incoming service request is received at the sequencing component prior to the target business service component being called. The sequencing component kind then determines whether it is recommended that the operation specified in the request be sequenced by checking to see if the operation is defined in the hash table (step 1010). The recommendation may comprise a requirement that the operation be sequenced action, or a suggestion that the operation should be sequenced. If the operation is not found in the hash table (a 'no' output to step 1010), then no sequencing is required to be performed on the request, and the process skips to step 1030 to proceed with the invocation of the request. In step 1030, a determination is then made as to whether the request is synchronous. If the request is a synchronous request (a 'yes' output to step 1030), the process will invoke the target component synchronously (step 1032). For example, the process may call the 'update' operation synchronously. If the request is an asynchronous request (a 'no' output to step 1030), the process then proceeds to perform the operation by invoking the target component asynchronously (step 1034), with the process terminating thereafter. For instance, the 'update' operation may be called asynchronously, and the sequencing component's implementation is passed as the callback parameter of the asynchronous invocation.

Turning back to step 1010, if the operation is found in the hash table (a 'yes' output to step 1010), the sequencing component kind classifies the request key information in the payload by retrieving the lock name space and operation sequencing pair for the operation from the hash table (step 1014), and then obtaining the actual key value from the request's payload according to the key specification of the operation sequencing element in the sequencing specification (step 1016). For instance, the request key information and value may be a bank account number. The sequencing component kind then requests that a lock be created on the request using the operation and the key information (step 1018). For example, a lock request may comprise a lock name space (LNS) and the request key information for the operation.

Next, a determination is made as to whether the lock has been granted (step 1020). If no lock is granted (a 'no' output to step 1020), a determination is made as to whether the request is synchronous (step 1022). If the request is a synchronous request (a 'yes' output to step 1022), the process waits at step 1024 for the lock to be granted. This waiting may be performed by registering a semaphore as part of the lock request, and the process will wait on that semaphore. Once the lock is granted, the process will invoke the target component synchronously (step 1026). For example, the process may call the 'update' operation synchronously.

Turning back to step 1022, if the request is an asynchronous request (a 'no' output to step 1022), then the process remembers the caller's asynchronous callback, and returns (step 1028), with the process terminating thereafter.

Turning back to step 1020, if the request is granted (a 'yes' output to step 1020), a determination is made as to whether the request is synchronous (step 1030). If the request is synchronous request, the process will invoke the target component synchronously (step 1032). For example, the process may call the 'update' operation synchronously. If the request is an asynchronous request, the process then proceeds to perform the operation by invoking the target component asynchronously (step 1034), with the process terminating thereafter.

FIG. 11 is a flowchart of a process for invoking a callback to the sequencing component in accordance with the illustrative embodiments. The process described in FIG. 11 may be implemented in a data processing system, such as data processing system 200 in FIG. 2. As mentioned in FIG. 10 above, the sequencing component invokes the target for the business logic, and it is important to note that the target is always invoked asynchronously. In this illustrative example, the callback is invoked when the asynchronous response returns to the sequencing component kind (step 1102). The process then calls the original caller's callback (step 1104), which was saved as part of the handling of the original asynchronous requests, as described in step 1028 in FIG. 10. When the callback arrives, the callback implementation may either wake up the waiting process in the synchronous request case in step 1024 in FIG. 10 which then proceeds to perform the actual target invocation, or in the asynchronous case, the callback implementation may perform the actual target invocation. Upon receiving the response (callback) at the sequencing component kind, the sequencing component kind calls an unlock function to unblock the next request in the operation sequencing group (step 1106). The sequencing component kind then calls the target business component for the request that has just been unblocked (step 1108), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for guaranteeing a processing order of requests in a business integration environment, the computer implemented method comprising:
   prior to receiving a request at a sequencing component, reading a sequencing specification to determine a processing order of incoming requests, wherein the sequencing specification specifies one or more operation sequencing groups;
   responsive to reading the sequencing specification, mapping each operation sequencing group specified in the sequencing specification to a different lock name space, wherein each operation sequencing group defines a group of requests to be processed in a particular order;
   constructing a hash table keyed by operation, wherein a value of each operation in the hash table is defined as a lock name space and operation sequencing pair;
   responsive to receiving the request at the sequencing component, identifying, by a computer, an operation specified in the request; determining whether to sequence the operation according to the sequencing specification based on whether the operation is defined in the hash table as the lock name space and the operation sequencing pair, wherein the sequencing specification specifies an order in which the requests are received and processed at the sequencing component;
   responsive to a determination that the operation is defined in the hash table, classifying key information of the operation obtained from a payload of the request according to the sequencing specification, wherein the key information from the payload is used in determining a processing order of related requests; requesting a lock on the request using the operation and the key information;
   responsive to the lock being granted, determining whether the request is synchronous or asynchronous;
   if the request is synchronous, invoking a target service component synchronously in accordance with the sequencing specification; and
   if the request is asynchronous, invoking the target service component asynchronously.

2. The computer implemented method of claim 1, further comprising:
   responsive to a determination not to sequence the operation, determining whether the request is synchronous or asynchronous;
   if the request is synchronous, invoking the target service component synchronously; and
   if the request is asynchronous, invoking the target service component asynchronously.

3. The computer implemented method of claim 1, further comprising:
   if the request is asynchronous, passing an implementation of the sequencing component as a callback parameter of the asynchronous invocation.

4. The computer implemented method of claim 1, wherein classifying key information of the operation further comprises:
   retrieving the lock name space and the operation sequencing pair for the operation from the hash table; and
   obtaining the key information from a payload of the request according to a key specification of the operation sequencing in the sequencing specification.

5. The computer implemented method of claim 1, further comprising:
   responsive to no lock being granted, determining whether the request is synchronous or asynchronous;
   if the request is synchronous, registering a semaphore as part of the lock request to wait for the lock to be granted; and
   invoking the target service component synchronously when the lock is granted.

6. The computer implemented method of claim 1, wherein the request is received at the sequencing component prior to invoking a target business service component.

7. The computer implemented method of claim 1, wherein the sequencing specification is user-defined.

8. The computer implemented method of claim 1, further comprising:
   invoking a callback upon return of an asynchronous response to the sequencing component, wherein the callback invocation comprises:
   invoking the target service component;
   responsive to receiving the callback at the sequencing component, calling an unlock function to unblock a next request in the sequencing specification; and
   invoking the target service component for the next request.

9. A data processing system for guaranteeing a processing order of requests in a business integration environment, the data processing system comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to, prior to receiving a request at a sequencing component, read a sequencing specification to determine a processing order of incoming requests, wherein the sequencing specification specifies one or more operation sequencing groups; responsive to reading the sequencing specification, map each operation sequencing group specified in the sequencing specification to a different lock name space, wherein each operation sequencing group defines a group of requests to be processed in a particular order; construct a hash table keyed by operation, wherein a value of each operation in the hash table is defined as a lock name space and operation sequencing pair, identify an operation specified in the request in response to receiving the request at the sequencing component, determine whether to sequence the operation according to the sequencing specification based on whether the operation is defined in the hash table as the lock name space and the operation sequencing pair, wherein the sequencing specification specifies an order in which the requests are received and processed at the sequencing component, classify key information of the operation obtained from a payload of the request according to the sequencing specification in response to a determination that the operation is defined in the hash table, wherein the key information from the payload is used in determining a processing order of related requests, request a lock on the request using the operation and the key information, determine whether the request is synchronous or asynchronous in response to the lock being granted, invoke a target service component synchronously if the request is synchronous in accordance with the sequencing specification, and invoke the target service component asynchronously if the request is asynchronous.

10. The data processing system of claim 9, wherein the processing unit further executes the computer usable code to determine whether the request is synchronous or asynchronous in response to a determination not to sequence the operation, invoke the target service component synchronously if the request is synchronous, and invoke the target service component asynchronously if the request is asynchronous.

11. A computer program product for guaranteeing a processing order of requests in a business integration environment, the computer program product comprising:
   a computer readable storage medium having computer usable program code stored thereon, the computer usable program code comprising:
      computer usable program code for, prior to receiving a request at a sequencing component, reading a sequencing specification to determine a processing order of incoming requests, wherein the sequencing specification specifies one or more operation sequencing groups;
      computer usable program code for, responsive to reading the sequencing specification, mapping each operation sequencing group specified in the sequencing specification to a different lock name space, wherein each operation sequencing group defines a group of requests to be processed in a particular order;
      computer usable program code for constructing a hash table keyed by operation, wherein a value of each operation in the hash table is defined as a lock name space and operation sequencing pair;
      computer usable program code for identifying an operation specified in the request in response to receiving the request at the sequencing component;
      computer usable program code for determining whether to sequence the operation according to the sequencing specification based on whether the operation is defined in the hash table as the lock name space and the operation sequencing pair, wherein the sequencing specification specifies an order in which the requests are received and processed at the sequencing component;
      computer usable program code for classifying key information of the operation obtained from a payload of the request according to the sequencing specification in response to a determination that the operation is defined in the hash table, wherein the key information from the payload is used in determining a processing order of related requests;
      computer usable program code for requesting a lock on the request using the operation and the key information;
         computer usable program code for determining whether the request is synchronous or asynchronous in response to the lock being granted;
      computer usable program code for invoking a target service component synchronously if the request is synchronous in accordance with the sequencing specification; and
      computer usable program code for invoking the target service component asynchronously if the request is asynchronous.

12. The computer program product of claim 11, further comprising:
   computer usable program code for determining whether the request is synchronous or asynchronous in response to a determination not to sequence the operation;
   computer usable program code for invoking the target service component synchronously if the request is synchronous; and
   computer usable program code for invoking the target service component asynchronously if the request is asynchronous.

13. The computer program product of claim 11, further comprising:
   computer usable program code for passing an implementation of the sequencing component as a callback parameter of the asynchronous invocation if the request is asynchronous.

14. The computer program product of claim 11, wherein the computer usable program code for classifying key information of the operation further comprises:
   computer usable program code for retrieving the lock name space and operation sequencing pair for the operation from the hash table; and
   computer usable program code for obtaining the key information from a payload of the request according to a key specification of the operation sequencing in the sequencing specification.

15. The computer program product of claim 11, further comprising:
   computer usable program code for determining whether the request is synchronous or asynchronous in response to no lock being granted;
   computer usable program code for registering a semaphore as part of the lock request to wait for the lock to be granted if the request is synchronous; and
   computer usable program code for invoking the target service component synchronously when the lock is granted.

16. The computer program product of claim 11, wherein the request is received at the sequencing component prior to invoking a target business service component.

17. The computer program product of claim 11, wherein the sequencing specification is user-defined.

18. The computer program product of claim 11, further comprising:
   computer usable program code for invoking a callback upon return of an asynchronous response to the sequencing component, wherein the callback invocation comprises:
   computer usable program code for invoking the target service component;
   computer usable program code for calling an unlock function to unblock a next request in the sequencing specification in response to receiving the callback at the sequencing component; and
   computer usable program code for invoking the target service component for the next request.

* * * * *